March 12, 1963  J. STEPHENS  3,081,098
SEALS FOR ROTARY SHAFTS OR THE LIKE
Filed Dec. 14, 1959
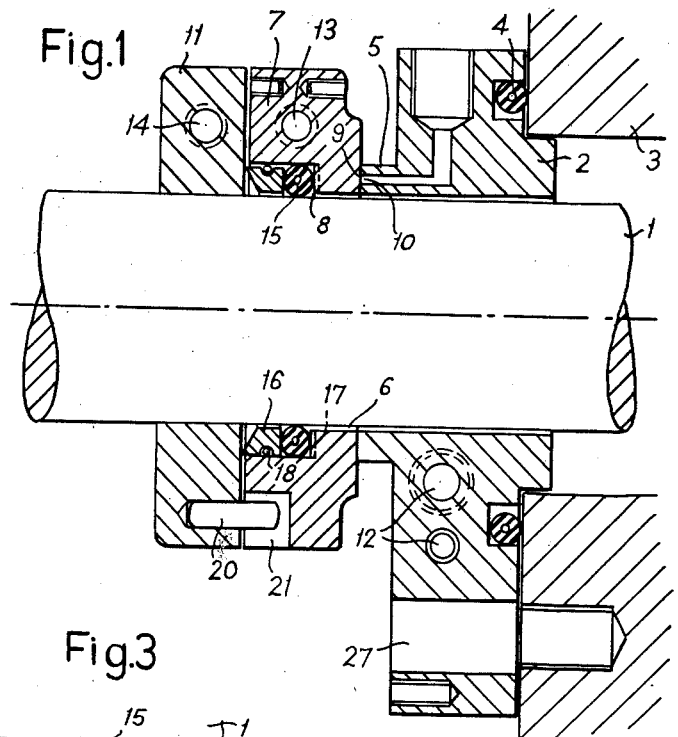
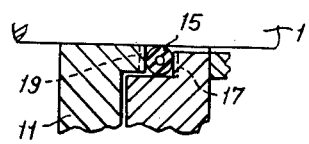
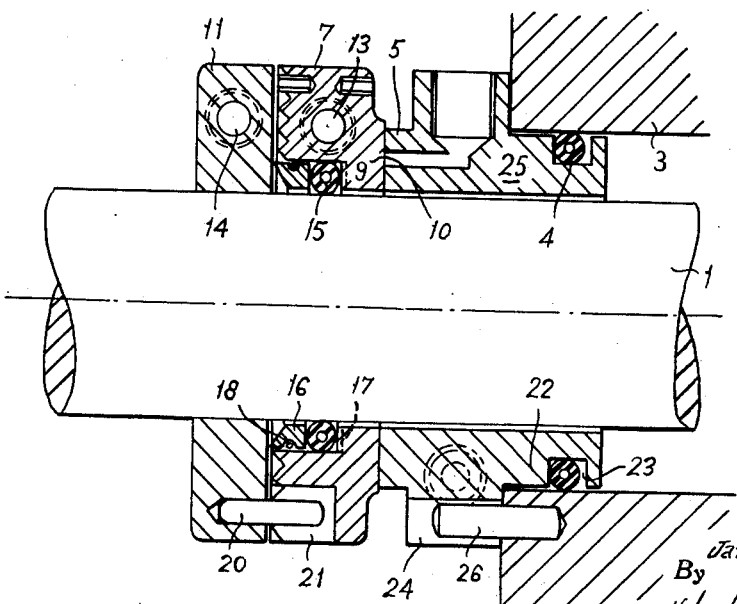
Inventor
James Stephens
By
Attorneys

United States Patent Office 3,081,098
Patented Mar. 12, 1963

3,081,098
SEALS FOR ROTARY SHAFTS OR THE LIKE
James Stephens, Bradford, England, assignor to The Universal Metallic Packing Company Limited, Bradford, England, a British company
Filed Dec. 14, 1959, Ser. No. 859,395
13 Claims. (Cl. 277—27)

The present invention relates to seals for rotary shafts or the like of the kind comprising a clamping ring adapted to be clamped on the rotatable shaft or the like alongside and substantially in axial alignment with a rotatable ring having a sealing face at the end thereof opposite to the clamping ring, which sealing face is adapted to engage with a sealing face surrounding an opening in a member through which the shaft or the like passes. In such devices as hitherto constructed, the rotatable ring has an opening therein through which the shaft can pass with clearance, which opening enlarges into an annular recess or counterbore which is open at the other end of the rotatable ring adjacent the clamping ring. Thus fluid pressure in the region of the clamping ring can be transmitted to the open end of the annular recess and fluid pressure beyond the sealing face at the other end of the rotatable ring can be transmitted to the inner end of the annular recess adjacent the sealing face. A resilient compressible sealing ring is fitted in the annular recess to provide a seal between the rotatable shaft and the rotatable ring. In the known constructions springs are provided for normally holding the sealing faces in contact when the fluid pressures on both sides of the seal are equal.

The present invention consists in an improvement in seals of the above kind, in which the resilient compressible sealing ring is arranged to provide sufficient force to maintain the sealing faces in contact when the fluid pressures at both sides of the seal are equalized, whereby the provision of separate springs for this purpose are dispensed with.

In order that the invention may be more clearly understood, various embodiments thereof will now be described, by way of example, with reference to the accompanying drawings, in which:

FIGURE 1 is a sectional view of one form of seal according to the invention in which the upper part is taken in one radial plane and the lower part in a different radial plane.

FIGURE 2 is a sectional view taken in different planes in its upper and lower parts, illustrating a second form of seal according to the invention.

FIGURE 3 shows a detail of a modification.

In the arrangement shown in FIGURE 1, a shaft 1 passes through a cover 2 of a casing 3. The cover 2, which may be regarded as a non-rotatable ring, is sealed against the casing 3 by means of a sealing ring 4. It is secured by screws 27. An annular extension 5, projecting axially from the cover 2, extends around an opening in the cover 2 through which the shaft 1 passes. This opening is of greater diameter than the shaft 1 so as to provide a clearance therebetween.

A rotatable ring 7 is formed as a cup with a central opening 6 at its right hand end and with an internal annular recess 8 extending inwardly up to the opening 6 from its left hand end. At its right hand end the ring 7 is formed with an annular sealing space 9 which is in face-to-face contact with a sealing face 10 on the extension 5. The right hand or inner end of the annular recess 8 communicates with the interior of the casing 3 through the opening 6.

A clamping ring 11 is fixedly mounted on the shaft 1 to the left of the rotatable ring 7.

The rotatable ring 7 is formed in two halves, having faces which meet in a more or less diametral plane and are secured together in sealing engagement with one another by bolts 13. The cover 2 is likewise formed in two halves, the joining faces of which meet in a more or less diametral place and are held in sealing engagement with one another by bolts 12 on opposite sides of shaft 1.

The clamping ring 11 is also formed in two halves secured together by bolts 14 on opposite sides of the shaft 1 but with their faces slightly spaced apart so as to enable the clamping ring 11 to be firmly clamped on the shaft 1.

By forming the rings 7 and 11 and the cover 2 in halves the seal can be dismantled without passing the rings over the end of the shaft 1, but the invention includes seals in which rings 7 and 11 and cover 2 are each formed in one piece.

A resilient compressible sealing ring 15 is axially displaceable in the annular recess 8, and provides a seal between the rotatable packing ring 7 and the shaft 1. The ring 15 is made of rubber or like material and is preferably of tubular form to aid compressibility. This resilient compressible sealing ring 15 is such that although it is capable of providing a seal between the ring 7 and the shaft 1, it can nevertheless be axially compressed and displaced in the recess 8 without undue frictional resistance.

Venting ring 16 and radial venting grooves 17 in the recess face of the cup 7 are provided on opposite sides of the resilient compressible sealing ring 18. The venting ring 16 is formed in two parts which are held together by a garter spring 18.

It will be noted that the venting ring 16 is chamfered on that side thereof adjacent to the inner face of the clamping ring 11 whilst the radial grooves are cut in the end face of the annular recess 8, whereby pressure either externally or internally from the casing 3, via the opening 6 at the end of the rotatable ring 7, can gain free access to the respective sides of the resilient compressible sealing ring 15, and the diameters of the venting ring 16 allows this ring to be axially displaced.

Axially directed pins 20 on the clamping ring 11 extend into axial recesses 21 on the rotatable ring 7 to provide a positive drive from the clamping ring 11 to the rotatable ring 7, though seals as described can and have been run successfully without driving pins.

In the seal of FIGURE 1 the pressures on opposite sides of the seal, that is to say the pressure within the casing 3 and in the region of the clamping ring 11, act on opposite sides of the resilient compressible ring 15. This ring, on assembly of the seal, is normally held lightly compressed between the venting ring 16, which in turn touches the clamping ring 11, and the end face of the recess 8 to ensure that faces 9 and 10 are urged into contact when the pressures are equal on both sides of the seal. A positive pressure within the casing 3 will compress the resilient compressible sealing ring 15 to the left, leaving only the fluid pressure inside the seal acting on the effective facial recess area to seal off its own escape between the faces 9 and 10. Since an increase of positive pressure within the seal demands an increased resistance to leakage across the sealing faces 9, 10, it may be said that the force applied to the rotatable ring 7 to maintain the seal will automatically vary more or less in proportion to the demand upon the seal. In so far as an increasing demand for resistance to leakage may be taken to imply that the increasing internal positive pressure gives rise to some force tending to move the sealing faces 9 and 10 apart, the seal in FIGURE 1 may be regarded as self-balancing since the applied force tending to hold the faces 9 and 10 in sealing engagement rises with an increasing force in the opposite direction. The existance of this self-balancing effect under these conditions is confirmed by practical experience.

When the external pressure is atmospheric whilst the pressure within the seal is below atmospheric, the pressure difference will cause the resilient compressible ring 15 to compress to the right, whereby the venting ring 16 is released whilst the reduction in pressure in the annular recess as compared with the external pressure will be compensated by the external pressure forcing the resilient ring 15 to the right against the recess face, thereby holding the sealing faces 9 and 10 in contact against the same external pressure which is trying to enter the seal between them.

FIGURE 2 illustrates a modified seal according to the invention, having a rotatable shaft 1, casing 3, clamping ring 11, rotatable ring 7, members 15, 16 and 18 and venting grooves 17 all as indicated in FIGURE 1. The sealing face 9 of the rotatable ring 7 engages with the sealing face 10 at the left hand end of a non-rotatable ring 25, the right hand portion 22 of which is of suitable diameter to enter into the casing or stuffing box 3 and is formed with a radially outward open annular recess 23 in which is arranged a resilient compressible sealing ring 4 to seal the non-rotatable ring 25 against the wall of the casing or stuffing box 3, the resilient sealing ring 4 being preferably similar to ring 15 in formation.

The non-rotatable ring 25 has a slot 24 therein to receive a peg 26 secured to the casing 3, whereby to prevent the ring 25 from rotating.

As with the embodiment of FIGURE 1, the internal diameters of the rotatable and non-rotatable rings are a little greater than the diameter of the shaft 1 to provide a clearance between the shaft and the rings 7 and 25.

Each part may be formed in one piece, but is preferably formed in two halves (except for the resilient compressible sealing rings which are cut as a length of tubing) as in FIGURE 1 so that the seal can be dismantled without drawing the rings over the end of the shaft.

The mode of operation of the seal shown in FIGURE 2 is similar in principle to that of FIGURE 1. If the external pressure is atmospheric and the internal pressure is above atmospheric, the internal pressure will press the non-rotatable ring 25 axially towards the rotatable ring 7 to keep the sealing faces 9 and 10 in sealing engagement with one another. As the internal pressure increases the rings 25 and 7 will move to the left into contact with the clamping ring 11, thereby compressing the resilient compressible sealing ring 15 slightly and leaving the internal pressure acting on the inner end areas of rings 25 and 4 to seal against its own escape between the sealing faces 9 and 10 which are of approximately equal area to the inner end combined effective areas of rings 25 and 4 upon which the internal pressure is acting.

If a negative pressure exists in the stuffing box or casing 3, then the atmospheric pressure on the effective left hand end area of the rotatable ring 7 and the resilient compressible sealing ring 15 will keep the sealing faces 9 and 10 in sealing contact.

The inner end face of the clamping ring 11, or the outer end face of the ring 7 should, on this seal, have a V type scroll groove extending across its whole radial width to ensure correct venting when the two are in contact with each other and to prevent them from sticking together.

Thus the embodiment of FIGURE 2 can maintain a tight seal under either pressure or vacuum conditions within the seal, even though no springs are fitted.

FIGURE 3 shows a modification, which can be applied to the embodiments shown in either FIGURE 1 or 2, in which the venting ring 16 is dispensed with, the clamping ring 11 having a collar portion projecting in the end of the recess 8 and having venting grooves 19 in its end face which engages the resilient compressible ring 15. The ring 15 is normally compressed between the end face of this collar portion and the end face of the recess 8 to hold the sealing faces 9 and 10 in contact when the pressures on both sides of the seal are equal.

In all embodiments, when necessary, lubrication provision is provided to ensure that the sealing faces remain moist.

Whilst particular embodiments have been described, it will be understood that various modifications may be made without departing from the scope of the invention as defined by the appended claims. For example, the cover 2 in FIGURE 1 may form part of the casing itself. Further, where convenient, the clamping ring may be replaced by a shoulder or collar on the shaft itself.

I claim:

1. A seal for a rotary shaft comprising a rotatable ring having a bore through which the shaft can pass with clearance, said rotatable ring having a sealing face at one end thereof and adjacent said bore which is adapted to engage with a sealing face surrounding an opening in a member through which the shaft passes, and also having an annular cylindrical recess of larger diameter and coaxial with its bore, said recess being open at the end of the rotatable ring opposite to its sealing face and having an end wall at its inner end, a resilient compressible sealing ring located in said recess to provide a seal between the rotatable shaft and the rotatable ring, and the shaft being provided with an abutment adjacent the end of the rotatable ring into which the recess opens, wherein the resilient compressible sealing ring is so dimensioned as to provide an axial force between said end wall and said abutment to maintain the sealing faces in contact when the fluid pressures at both sides of the seal are equalized.

2. A seal as claimed in claim 1, wherein the member through which the shaft passes is movable in the axial direction of the shaft relative to a housing from which the shaft extends, sealing means being provided between said member and said housing.

3. A seal as claimed in claim 2, wherein the end face of the rotatable ring which abuts against the abutment is provided with a groove to provide venting between these parts.

4. A seal for a rotary shaft comprising a rotatable ring having a bore through which the shaft can pass with clearance, said rotatable ring having a sealing face at one end thereof and adjacent said bore which is adapted to engage with a sealing face surrounding an opening in a member through which the shaft passes, and also having an annular cylindrical recess of larger diameter and coaxial with its bore, said recess being open at the end of the rotatable ring opposite to its sealing face and having an end wall at its inner end, a resilient compressible sealing ring located in said recess to provide a seal between the rotatable shaft and the rotatable ring, an abutment provided on the shaft adjacent the end of the rotatable ring into which the recess opens, and at least one incompressible member disposed between the resilient compressible sealing ring and at least one of said abutment and end wall, the sealing ring being so dimensioned that in conjunction with said at least one incompressible member it produces an axial force between said end wall and said abutment to maintain the sealing faces in contact when the fluid pressures at both sides of the seal are equalized.

5. A seal as claimed in claim 4, wherein the sealing ring abuts against said end wall, said end wall being formed with venting grooves connecting with the bore.

6. A seal as claimed in claim 4, wherein the member through which the shaft passes is movable in the axial direction of the shaft relative to a housing from which the shaft extends, sealing means being provided between said member and said housing.

7. A seal as claimed in claim 6, wherein the end face of the rotatable ring which abuts against the abutment is provided with a groove to provide venting between these parts.

8. A seal for a rotary shaft where it passes out of an opening in a housing, comprising a non-rotatable ring having a bore through which the shaft passes with clearance, an annular groove in a face of said non-rotatable ring abutting said housing, sealing means in said annular groove and in sealing engagement with said housing, means connecting said housing and said non-rotatable ring for preventing rotation of the latter, a rotatable ring having a central bore through which the shaft passes with clearance, said rotatable ring having a sealing face at one end thereof and adjacent said bore which is adapted to abut against a sealing face surrounding the bore of said non-rotatable ring, and also having an annular cylindrical recess of larger diameter and coaxial with its bore, said recess being open at the end of the rotatable ring opposite to its sealing face and having an end wall at its inner end, a resilient compressible sealing ring located in said recess to provide a seal between the rotatable shaft and the rotatable ring, said sealing ring abutting said end wall, a clamping ring secured on the shaft to form an abutment adjacent the end of the rotatable ring into which the recess opens, means interconnecting the rotatable ring to said clamping ring to prevent rotational movement while permitting axial movement therebetween, and a venting ring disposed between the resilient compressible sealing ring and the abutment and, when the fluid pressure at both sides of the seal are equalized, causing the resilient sealing ring to press axially against said end wall whereby the resilient sealing ring exerts an axial force to maintain the sealing faces on the rotatable and non-rotatable rings in contact when the fluid pressures at both sides of the seal are equalized.

9. A seal as claimed in claim 8, wherein the non-rotatable ring is formed with a boss which slidably fits within the opening in the housing, and said annular groove is formed in the periphery of said boss and accommodates a second sealing ring which seals against the bore of said opening in the housing whereby to permit axial movement of the non-rotatable ring, and wherein the end face of the rotatable ring adjacent the clamping ring is provided with a groove to provide venting when said end face abuts the clamping ring.

10. A seal for a rotary shaft where it passes out of an opening in a housing, comprising a non-rotatable ring having a bore through which the shaft passes with clearance, an annular groove in a face of said non-rotatable ring abutting said housing, sealing means in said annular groove and in sealing engagement with said housing, means connecting said housing and said non-rotatable ring for preventing rotation of the latter, a rotatable ring having a central bore through which the shaft passes with clearance, said rotatable ring having a sealing face at one end thereof and adjacent said bore which is adapted to abut against a sealing face surrounding the bore of said non-rotatable ring, and also having an annular cylindrical recess of larger diameter and coaxial with its bore, said recess being open at the end of the rotatable ring opposite to its sealing face and having an end wall at its inner end, a resilient compressible sealing ring located in said recess to provide a seal between the rotatable shaft and the rotatable ring, said sealing ring abutting said end wall, a clamping ring secured on the shaft to form an abutment adjacent the end of the rotatable ring into which the recess opens, means interconnecting the rotatable ring to said clamping ring to prevent rotational movement while permitting axial movement therebetween, and a collar portion on said clamping ring which projects into said recess and bears against the resilient compressible sealing ring to press it axially against said end wall, whereby the resilient sealing ring exerts an axial force to maintain the sealing faces on the rotatable and non-rotatable rings in contact when the fluid pressures at both side of the seal are equalized.

11. A seal for a rotary shaft where it passes out of an opening in a housing, comprising a non-rotatable ring having a bore through which the shaft passes with clearance, means fixing said non-rotatable ring over said opening and projecting from said housing, said non-rotatable ring having a sealing face at its end away from said opening, a rotatable ring having a central bore through which the shaft passes with clearance, said rotatable ring surrounding the shaft outwardly of the non-rotatable ring and having a sealing face adjacent its bore at the end thereof adjacent the non-rotatable ring which is adapted to abut against the sealing face of said non-rotatable ring, and also having an annular cylindrical recess of larger diameter and coaxial with its bore, said recess being open at the end of the rotatable ring opposite to its sealing face and having an end wall at its other end, a resilient compressible sealing ring located in said recess to provide a seal between the rotatable shaft and the rotatable ring, a clamping ring secured on the shaft to form an abutment adjacent the end of the rotatable ring into which the recess opens, means interconnecting the rotatable ring to said clamping ring to prevent rotational movement while permitting axial movement therebetween, and a venting ring disposed in the recess between the resilient compressible sealing ring and the abutment and having a length such that, when the sealing faces of the rotatable and non-rotatable rings are in contact and the venting ring is in engagement with the abutment, the resilient compressible sealing ring will be lightly pressed between the venting ring and said end wall.

12. A seal as claimed in claim 11, wherein each of said non-rotatable, rotatable and clamping rings is made of a plurality of segments which are secured together to form the respective rings.

13. A seal for a rotary shaft where it passes out of an opening in a housing, comprising a non-rotatable ring formed with a boss which slidably fits within said opening in the housing, sealing means disposed in an annular groove formed in the periphery of said boss which seals against the bore of said opening in the housing while permitting axial movement of the non-rotatable ring in said bore, means for preventing rotation of said non-rotatable ring within said opening, said non-rotatable ring having a bore through which the shaft passes with clearance and being formed at its end opposite to said boss with a sealing face the external diameter of which is approximately equal to the diameter of said opening in the housing, a rotatable ring having a central bore through which the shaft passes with clearance, said rotatable ring having a sealing face adjacent its bore at the end thereof adjacent the non-rotatable ring which is adapted to abut against the sealing face of the non-rotatable ring, said rotatable ring also having an annular cylindrical recess of larger diameter and coaxial with its bore, said recess being open at the end of the rotatable ring opposite to its sealing face and having an end wall at its other end, a clamping ring secured on the shaft to form an abutment adjacent the end of the rotatable ring into which the recess opens, means interconnecting the rotatable ring to said clamping ring to prevent rotational movement while permitting axial movement therebetween, a venting ring disposed in said recess at the end thereof adjacent said abutment, and a resilient compressible sealing ring disposed in said recess between the venting ring and said end wall.

References Cited in the file of this patent
UNITED STATES PATENTS

| 2,434,458 | Curry | Jan. 13, 1948 |
| 2,462,586 | Whittingham | Feb. 22, 1949 |
| 2,483,827 | Guiler | Oct. 4, 1949 |
| 2,710,206 | Huber | June 7, 1955 |

FOREIGN PATENTS

| 67,869 | France | Mar. 25, 1958 |